March 23, 1937.   L. RICEFIELD   2,074,941
COUPLING
Filed Dec. 28, 1935
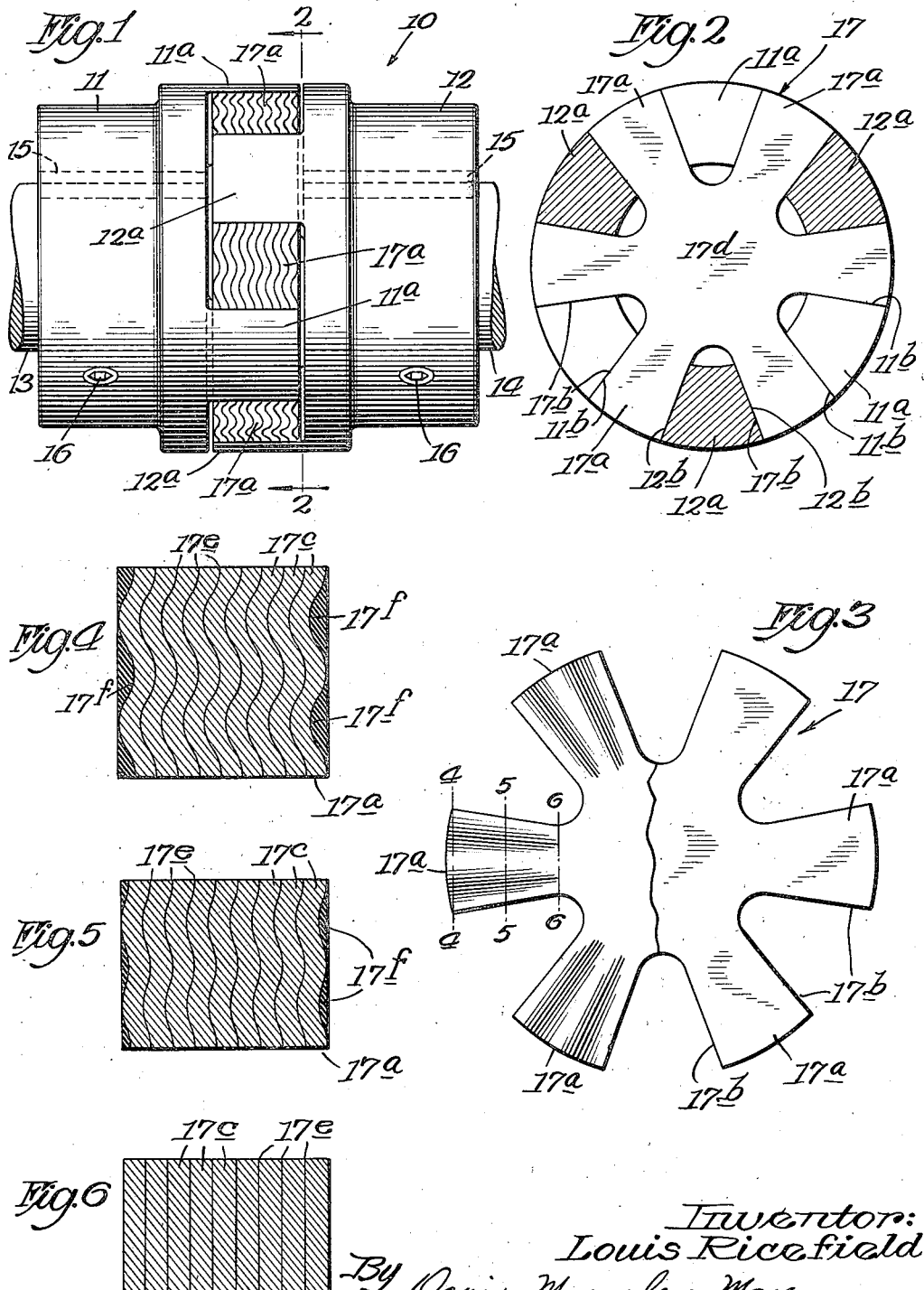

Patented Mar. 23, 1937

2,074,941

UNITED STATES PATENT OFFICE 2,074,941

COUPLING

Louis Ricefield, Oak Park, Ill.

Application December 28, 1935, Serial No. 56,522

5 Claims. (Cl. 64—14)

This invention relates to improvements in couplings for connecting substantially aligned shafts and its purpose is to provide an improved device adapted to compensate for relative radial displacement, angular misalignment and relative endwise movement of the shafts. The invention comprises a coupling of the spider type in which a pair of coupling members, each adapted to be secured upon one of the substantially aligned shafts and each having a plurality of lugs or jaws extending longitudinally therefrom to intermesh loosely with the lugs or jaws carried by the other coupling member, in combination with an intermediate power transmitting spider having a central hub provided with radiating arms formed of resilient material, each arm being adapted to extend between and contact with two lugs or jaws carried by opposite coupling members. The improvement of the present invention may preferably be applied to couplings having spider arms each provided with opposite lug engaging surfaces which are outwardly diverging, as described and claimed in my co-pending applications Serial No. 12,226, filed March 21, 1935, and Serial No. 48,659, filed November 7, 1935, but the improvement may also be employed in couplings having spider arms provided with opposite parallel lug engaging surfaces.

It has been the practice in constructing certain forms of couplings of the spider type heretofore marketed by me to form the spiders of laminations of leather, rubberized duck, rubber or other resilient materials which have been arranged with the laminations extending transversely to the direction in which forces are transmitted from a jaw of one coupling member to a jaw of the other coupling member, thus causing the laminations to be compressed transversely to their own planes but it has now been discovered that the wearing qualities of a laminated spider may be greatly increased and the cost of construction very materially reduced by arranging the laminations so that they are presented edgewise to the contacting surfaces of the lugs or jaws of the coupling members, whereby they are compressed along lines extending substantially in the direction of their own planes. It is therefore the principal object of the present invention to provide an improved coupling of the spider type in which the spider is made up of a plurality of laminations each extending parallel to the direction in which forces are transmitted from one coupling member to the other, so that the laminations of the radiating arms are presented edgewise to the contacting surfaces of the lugs or jaws of the coupling members. A further object of the invention is to provide an improved coupling of the spider type in which the spider is made up of a plurality of laminations each extending throughout the area of the spider and each secured to a next adjacent lamination by being vulcanized or cemented thereto, thus permitting the spider to be made up of stampings formed by stamping superimposed layers of the materials which are to be employed in constructing the composite spider. Still another object of the invention is to provide an improved coupling comprising a spider having laminations presented edgewise to the contacting surfaces of the lugs or jaws of the coupling members and having the laminations of the spider arms arranged in a wavy or irregular zigzag fashion between the lug engaging faces of the spider arm, thereby increasing the resilience of the spider arm and lessening the tendency to separation of the contacting laminations due to the fact that portions of the contacting surfaces of adjacent laminations extend more or less transversely to the direction in which forces are transmitted through the spider arm. Other objects of the invention relate to various features of construction and arrangement which will appear more fully hereinafter.

The nature of the invention will be understood from the following specification taken with the accompanying drawing, in which certain embodiments are illustrated. In the drawing, Fig. 1 shows a side elevation of an improved coupling embodying the features of the present invention;

Fig. 2 shows a sectional view taken on the line 2—2 of Fig. 1;

Fig. 3 shows an enlarged side elevation of the spider embodied in the construction of Figs. 1 and 2, with a portion of the outer layer of the spider removed;

Fig. 4 shows an enlarged sectional view taken on the line 4—4 of Fig. 3;

Fig. 5 shows an enlarged sectional view taken on the line 5—5 of Fig. 3; and

Fig. 6 shows an enlarged section taken on the line 6—6 of Fig. 3.

In the drawing, there is illustrated a spider 10 comprising two similar coupling members 11 and 12 which are adapted to be secured upon substantially aligned shafts 13 and 14, respectively, by means of keys 15 and set screws 16. Each coupling member 11 comprises a plurality of longitudinally extending lugs or jaws 11a which are adapted to intermesh loosely with similar longitudinally extending lugs or jaws 12a formed on the other coupling member and these lugs or jaws are adapted to receive between them the radiating arms 17a of a power transmitting spider 17 which may have the form shown particularly in Figs. 2 and 3. Each spider arm 17a is provided with opposite surfaces 17b which are adapted to contact with surfaces 11b and 12b which are formed on the lugs or jaws 11a and 12a, respectively. In the drawing, these contacting surfaces of each spider arm and the adjacent lugs or jaws are shown as being outwardly diverging, an arrangement which is adapted to increase the life and wearing qualities of the spider as set forth in my co-pending applications above referred to, but the construction of the spider of the present invention may also be employed in couplings having spider arms each provided with opposite parallel lug engaging surfaces.

The spider 17 is made up of a plurality of substantially parallel laminations 17c each of which includes a portion of each spider arm and a portion of the central hub 17d so that each lamination extends throughout the area of the spider in a direction transversely to the axes of the connected shafts. The laminations 17c may be made of rubberized duck or other material and they are preferably united with each other by being vulcanized together in a mold with comparatively thin layers 17e of rubber interposed between adjacent laminations 17c. In the embodiment illustrated, the portions of the laminations which make up the spider arms are waved or corrugated transversely to their own planes with a gradual increase of this effect from the inner end of the spider arm outwardly, as illustrated by Figs. 4, 5 and 6. The waves of adjacent laminations interfit with each other and the hollows which are thus formed at the outer surfaces of the spider are filled by portions of rubber 17f which are vulcanized in place at the time that the laminations are united. The portions of the laminations which form the hub 17d lie in parallel planes and in flat contact with each other and although this arrangement might be extended outwardly to the outer ends of the spider arms, we would then have a transverse cross-section similar to that of Fig. 6; these portions of the spider arms which are interposed between the lugs or jaws of the coupling members are preferably constructed by waving the laminations as shown in Figs. 4 and 5. This mode of construction increases the resilience of the spider arm since the laminations have an initial deflection transversely to the direction in which forces are transmitted therethrough and the wavy effect has the further advantage that the forces transmitted through the spider arm tend to compress the layers upon each other instead of separating them, due to the fact that portions only of the laminations lie in planes parallel to the directions in which forces are transmitted. Whether or not the laminations be waved or corrugated as above described, they may be varied in thickness in different parts of the spider as, for example, by varying the thickness of the laminations of rubber 17e radially of the spider arms, thereby causing the thickness of each spider arm between its end faces to vary in a manner which may be caused to bring about the desired degree of resiliency in each part of the spider arm and a uniformity or desired variation of the wearing qualities.

Although one form of the invention has been shown and described by way of illustration, it will be understood that it may be constructed in various other embodiments coming within the scope of the appended claims.

I claim:

1. The combination in a coupling for connecting substantially aligned shafts, of a pair of coupling members each adapted to be secured upon a separate one of said shafts, each of said coupling members having a plurality of longitudinally extending jaws adapted to intermesh loosely with the jaws carried by the other coupling member, and a power transmitting spider interposed between said coupling members and having a plurality of radiating arms each extending between and contacting with two of said jaws carried by opposite coupling members, said spider comprising laminations of non-metallic resilient material extending throughout the area of the spider transversely to its axis of rotation, the laminations in the arms of said spider being transversely corrugated.

2. The combination in a coupling for connecting substantially aligned shafts, of a pair of coupling members each adapted to be secured upon a separate one of said shafts, each of said coupling members having a plurality of longitudinally extending jaws adapted to intermesh loosely with the jaws carried by the other coupling member, and a power transmitting spider interposed between said coupling members and having a plurality of radiating arms each extending between and contacting with two of said jaws carried by opposite coupling members, said spider arms being made up of laminations extending edgewise to the surfaces of the jaws with which they contact, said laminations being provided with outwardly extending corrugations.

3. The combination in a coupling for connecting substantially aligned shafts, of a pair of coupling members each adapted to be secured upon a separate one of said shafts, each of said coupling members having a plurality of longitudinally extending jaws adapted to intermesh loosely with the jaws carried by the other coupling member, and a power transmitting spider interposed between said coupling members and having a plurality of radiating arms each extending between and contacting with two of said jaws carried by opposite coupling members, said spider arms being made up of laminations extending edgewise to the surfaces of the jaws with which they contact, said laminations being provided with outwardly extending corrugations increasing in depth toward the outer ends of the spider arms.

4. The combination in a coupling for connecting substantially aligned shafts, of a pair of coupling members each adapted to be secured upon a separate one of said shafts, each of said coupling members having a plurality of longitudinally extending jaws adapted to intermesh loosely with the jaws carried by the other coupling member, and a power transmitting spider interposed between said coupling members and having a plurality of radiating arms each extending between and contacting with two of said jaws carried by opposite coupling members, each of said spider arms being provided with opposite outwardly diverging surfaces adapted to coact with similar surfaces formed on the adjacent jaws, each of said spider arms being formed of laminations extending edgewise to the surfaces of the jaws with which they contact, said laminations being provided with outwardly extending corrugations which increase in depth toward the outer ends of the spider arms.

5. The combination in a coupling for connecting substantially aligned shafts, of a pair of coupling members each adapted to be secured upon a separate one of said shafts, each of said coupling members having a plurality of longitudinally extending jaws adapted to intermesh loosely with the jaws carried by the other coupling member, and a power transmitting spider interposed between said coupling members and having a plurality of radiating arms each extending between and contacting with two of said jaws carried by opposite coupling members, said spider being made up of a plurality of laminations each extending throughout the area of the spider transversely to its axis of rotation, the portions of the laminations forming the spider arms being corrugated with the corrugations extending radially outward.

LOUIS RICEFIELD.